Patented Aug. 19, 1924.

1,505,185

UNITED STATES PATENT OFFICE.

MARION S. BADOLLET, JOHN HAMILTON, AND CHARLES F. WALTON, JR., OF WASHINGTON, DISTRICT OF COLUMBIA, DEDICATED, BY MESNE ASSIGNMENTS, TO THE CITIZENS OF THE UNITED STATES OF AMERICA.

PERMANENT COLORIMETRIC STANDARD FOR HYDROGEN ION DETERMINATION.

No Drawing.   Application filed March 4, 1924. Serial No. 696,887.

(FILED UNDER THE ACT OF MARCH 3, 1883, 22 STAT. L., 625.)

*To all whom it may concern:*

Be it known that we, MARION S. BADOLLET, JOHN HAMILTON, and CHARLES F. WALTON, Jr., citizens of the United States of America, and employees of the United States Department of Agriculture, residing in the city of Washington, District of Columbia, have invented Permanent Colorimetric Standards for Hydrogen Ion Determination. This application is made under the act of March 3, 1883, chapter 143 (22 Stat. 625) and the invention herein described and claimed may be used by the Government of the United States or any of its officers or employees in the prosecution of work for the Government, or by any citizen of the United States, without payment to us of any royalty thereon.

This invention relates to the use in colorimetric hydrogen ion determinations of improved standards for color comparison.

Various colorimetric methods have been proposed for measuring hydrogen ion concentration, all of which are associated with certain limitations and disadvantages in actual practice. Some of these methods work fairly well on relatively pure and colorless solutions, whereas when it comes to determining the hydrogen ion concentration of sugar and other solutions, particularly when these are highly colored, they do not give the desired degree of accuracy. Considering the various methods and their limitations, it is considered that the so-called "block comparator" method is the most accurate in principle, and furthermore that, in actual practice with highly colored substances, it gives the most satisfactory results. Briefly, this method makes use of a series of color standards so prepared for each chemical indicator by using varying amounts of indicator that the characteristic color decreases from one extreme to the other. As an example, choosing bromcresol purple from the various indicators, this material in specified amount has a characteristic purple color when sufficient alkali is added to produce the full alkaline color. Using less of the indicator the color is less intense. It is not necessary to add an excess of alkali, as the characteristic color is not further intensified. Similarly, when sufficient acid is added to produce the full acid or yellow color, this, for bromcresol purple, is a characteristic color when, of course, the indicator is used in the specified amount, so that this yellow tint corresponds to the other extreme at which the indicator is of value to determine accurately hydrogen ion concentrations. The various other indicators which are used for this purpose behave similarly when specified amounts of indicator are taken and series of liquid color standards prepared therefrom. These indicators, in other words, are dyes which are of one color in acid solution and another color in alkaline medium, the depth of tint depending on the amount of indicator used. It is possible, therefore, by making use of this underlying principle, to reproduce a number of intermediate colors by the methods of chemistry, and in this way to arrange a series of colors graded from one extreme to the other with mathematical exactness. The color scale can then be divided to show what color for each indicator corresponds to a definite hydrogen ion concentration. In making use of this method of analysis, a certain number of drops of indicator of definite strength are added to a specified volume of the solution to be tested for acidity, the number of drops which are used corresponding to the number of drops used in the color standard. By simply comparing colors, it is then easily possible to determine the hydrogen ion concentration. A more complete description of this method is given in the Journal of the American Chemical Society, volume 42, 1920, pages 742–748.

The colorimetric method above described has recently been modified as follows: Instead of making up a number of separate color standards for a given indicator, use has been made of a rectangular block made in two parts by cutting the rectangle lengthwise along the diagonal. The rectangular block is, therefore, in reality, two wedges superimposed. These wedges have been made in the past of celluloid or other transparent material, and have been made hollow in order to contain the indicator. One wedge has contained the indicator in which the full alkaline color has been developed, while the other has contained the indicator in which the full acid color has been developed. By superimposing the wedges, therefore, and looking through to the light, the graduation of color is the same as though a series of separate color standards had been prepared. The wedge idea is excellent for the purpose, but the use of the indicator in liquid form within a transparent case has not, in practice, proved to be satisfactory. The underlying objection to this is the fact that the colors are not permanent. Various preservatives have been used to retard mold growth, deterioration by the light, or deterioration through the chemical reaction of the indicator itself with the containing receptacle. It has proved impossible, however, as yet, to so preserve these liquids that the colors remain permanent.

Our invention consists in the substitution of solid color standards made up to be used either as described for the block comparator method using separate color standards, or to be used in the wedge method. Provided it is desired to use the block comparator method, it is recommended to make up a number of individual colors shading gradually when placed together from one extreme to the other. This would be comparatively difficult to do, in that a large amount of experimenting would be necessary to reproduce exactly the desired colors. The method recommended is to make use of the wedge idea, making for each indicator two colored wedges of glass or other transparent material, one of which is the full acid color and the other the full alkaline color. The chemicals used to produce the desired colors in the solid material necessarily vary with the indicator colors to be duplicated. The selection of the proper chemicals and the transparent material in which the colors can best be incorporated in solid and permanent form is not claimed as our invention.

In using the wedge comparator method, it is necessary to put the liquid to be examined, and also a sample of the same liquid containing the specified amount of indicator, in flat containing vessels. Flat containers give better results than cylindrical containers, for the reason that there is less optical error. The apparatus at present on the market is unsatisfactory for the purpose, inasmuch as it is made of transparent material which is somewhat colored; hence an error is introduced in making the determination, this error depending on the degree of color in the containers which are used. It is recommended that these containers be made of absolutely colorless material, so that no error whatever will be introduced in connection with the analyses.

We claim:—

Permanent colorimetric standards for hydrogen ion determinations made from solid and transparent material, and containing permanent colors to correspond with those given by the use of well-known chemical indicators.

MARION S. BADOLLET.
JOHN HAMILTON.
CHARLES F. WALTON, Jr.